No. 784,229. PATENTED MAR. 7, 1905.
H. J. F. ROSE.
MACHINE FOR DRESSING OR SEPARATING FLOUR, &c.
APPLICATION FILED MAY 6, 1904.

Witnesses.
William Hudson.
Frederick Leech.

Inventor.
Henry John Fox Rose,
per John Pitt Bayley,
Attorney.

No. 784,229.     Patented March 7, 1905.

UNITED STATES PATENT OFFICE.

HENRY JOHN FOX ROSE, OF CHESHAM, ENGLAND.

MACHINE FOR DRESSING OR SEPARATING FLOUR, &c.

SPECIFICATION forming part of Letters Patent No. 784,229, dated March 7, 1905.

Application filed May 6, 1904. Serial No. 206,634.

*To all whom it may concern:*

Be it known that I, HENRY JOHN FOX ROSE, a subject of the King of Great Britain, residing at The Island, Chesham, in the county of Bucks, England, have invented new and useful Improvements in Machines for Dressing or Separating Flour and the Like, of which the following is a specification.

My invention relates to machines for dressing flour and the like and to that class of such machine wherein a reel or cylinder covered with silk cloth or the like is made use of, the object of my invention being to provide a more thorough yet gentle method of separation than usually obtains in such machines.

According to my invention the silk cloth or other cover is made in the form of a tube supported at the ends only, so as to leave an uninterrupted or unbroken surface throughout the entire length of the cylinder, and one or both of the end supports is or are composed of a series of spring-arms which will successively yield under the weight of the material lying at the bottom of the cylinder and as the cylinder rotates will return to their normal position to again tighten the silk, thereby exerting what I may term a "seesaw" movement of the silk in the direction of its length, which seesaw movement has the effect of greatly aiding the process of separation and automatically assists in keeping the meshes of the silk clean. The end supports are mounted upon a suitable shaft, and one of the said ends is made adjustable in the direction of the length of the shaft, so as to permit of adjusting the tension of the silk cover. I attain these objects by the mechanism illustrated in the accompanying drawings, in which—

Figure 1:
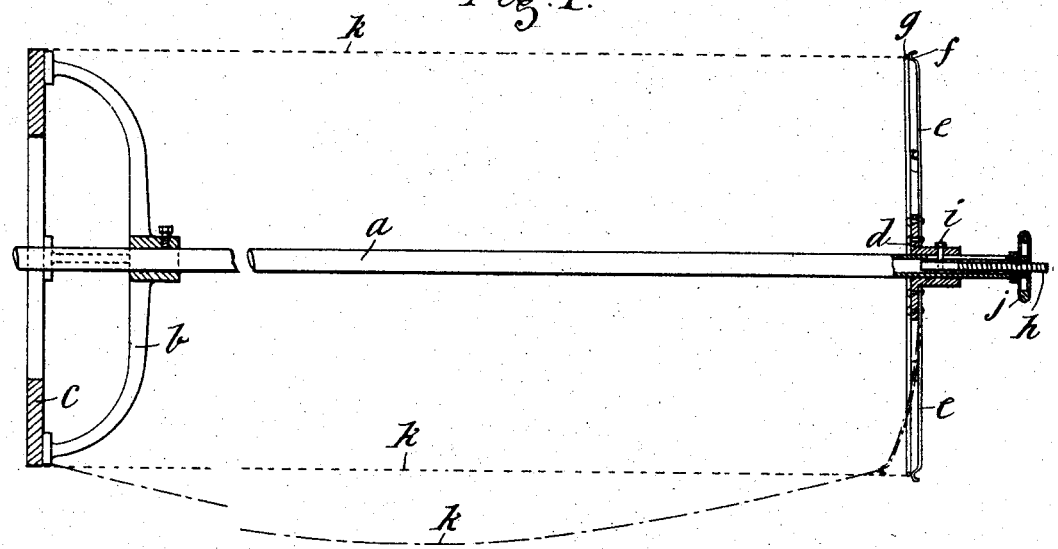
Figure 2:
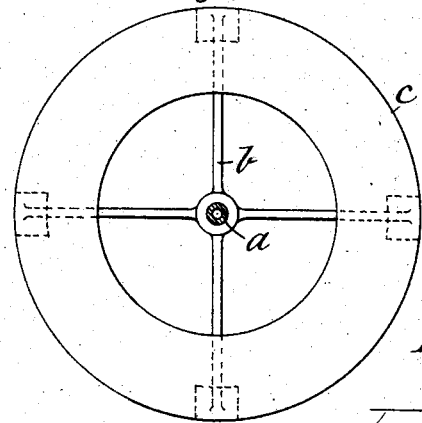
Figure 3:
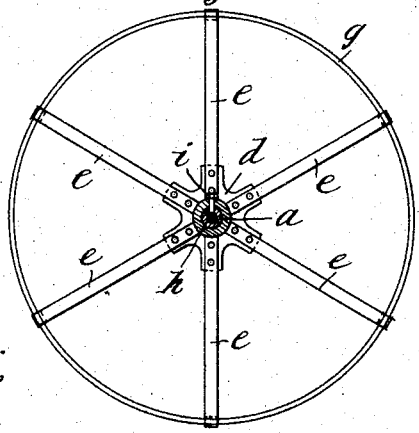
Figure 4:
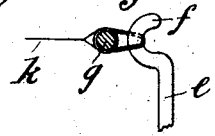

Figure 1 is a longitudinal section of a reel or cylinder constructed according to my invention. This figure is shown broken off for want of space. Figs. 2 and 3 are elevations of the left and right hand ends of the same, respectively. Fig. 4 is a sectional view, drawn to a larger scale than the other figures, illustrating the method of connecting the silk cover to the spring-arms.

$a$ is the shaft of the cylinder, which is preferably tubular, carrying at one end a frame or spider $b$, to which is attached a ring $c$, of wood or like material, and having at the other end a boss $d$, to which a series of spring-arms $e\ e$ are attached, the said spring-arms at their outer ends being provided with hooks, as at $f$ in Fig. 4, or otherwise adapted for the attachment of a ring of wire $g$. The boss $d$ is adapted to be adjusted longitudinally upon the shaft $a$. As shown, the adjustment is effected by means of a screw $h$, attached to a stud $i$ on the boss and carrying a hand-wheel $j$, formed with a nut to fit the screw, so that the rotation of the hand-wheel will cause the longitudinal movement of the screw $h$, and consequently, also, of the boss $d$. The stud $i$, which passes through a slot in the shaft $a$, serves to prevent the rotation of the boss upon the said shaft.

$k$ is the silk cover, which, as before stated, is in the form of a tube. The said cover is at one end connected by nails or tacks or by other suitable means to the ring $c$ and at the other end formed with a hem, into which the ring $g$ is introduced, as shown in Fig. 4, which ring is laced or otherwise secured to the hooks $ff$ on the spring-arms $e\ e$, the said ring $g$ being sufficiently flexible to follow the silk as the arms bend under the weight of the material in the cylinder.

The flour or like material to be dressed is introduced into the cylinder, which is suitably inclined, through the ring $c$ and gravitates through the said cylinder as the latter is rotated, the portion which does not escape through the silk being discharged between the spring-arms. The weight of the material in the cylinder causes the silk on the lower side thereof to sag—for instance, as indicated by the dot-and-dash line in Fig. 1—and it will be obvious that as the cylinder rotates the spring-arms will again return the silk to its normal position, thereby producing the desired motion.

What I claim as my invention, and desire to secure by Letters Patent, is—

In a machine for dressing flour and the like, the combination of a loose cloth or cover attached at one end to a rigid ring and at the other end to a series of spring-arms; the reel-shaft, the rigid head secured to or mounted on the shaft at one end, and the spring-arms at the other, substantially as described.

In testimony whereof I have signed my name to this specification in the presence of two subscribing witnesses.

HENRY JOHN FOX ROSE.

Witnesses:
WILLIAM HUDSON,
FREDERICK LEECH.